(12) United States Patent
Szymczyk et al.

(10) Patent No.: US 12,064,688 B2
(45) Date of Patent: Aug. 20, 2024

(54) METHODS AND SYSTEMS FOR DETERMINING DECAL PROJECTIONS INTERSECTING SPATIAL UNITS IN A FRAME OF A GAME SPACE

(71) Applicant: Activision Publishing, Inc., Santa Monica, CA (US)

(72) Inventors: Michal Szymczyk, Woodland Hills, CA (US); Michal Dominik Drobot, Venice, CA (US); Michael Kenneth Vance, Falmouth, ME (US)

(73) Assignee: Activision Publishing, Inc., Santa Monica, CA (US)

( * ) Notice: Subject to any disclaimer, the term of this patent is extended or adjusted under 35 U.S.C. 154(b) by 212 days.

(21) Appl. No.: 17/645,851

(22) Filed: Dec. 23, 2021

(65) Prior Publication Data

US 2022/0203231 A1    Jun. 30, 2022

Related U.S. Application Data

(60) Provisional application No. 63/131,966, filed on Dec. 30, 2020.

(51) Int. Cl.
*A63F 13/52* (2014.01)
*G06T 15/20* (2011.01)
*G06T 15/80* (2011.01)

(52) U.S. Cl.
CPC ............. *A63F 13/52* (2014.09); *G06T 15/20* (2013.01); *G06T 15/80* (2013.01)

(58) Field of Classification Search
CPC .......... A63F 13/52; G06T 15/20; G06T 15/80
See application file for complete search history.

(56) References Cited

U.S. PATENT DOCUMENTS 5,530,796 A   6/1996  Wang
5,561,736 A   10/1996 Moore
(Continued)

FOREIGN PATENT DOCUMENTS

AU        768367      3/2004
AU      2005215048   10/2011
(Continued)

OTHER PUBLICATIONS

Martin Evans, Drawing Stuff On Other Stuff With Deferred Screenspace Decals, 2015, martindevans.me, pp. 1-8, at https://martindevans.me/game-development/2015/02/27/Drawing-Stuff-On-Other-Stuff-With-Deferred-Screenspace-Decals (last visited Dec. 12, 2023). (Year: 2015).*

*Primary Examiner* — Steve Rowland
(74) *Attorney, Agent, or Firm* — Novel IP

(57) ABSTRACT

A method of shading spatial units while rendering a frame in a video game. Initially, the virtual camera field of view is divided into a group of spatial units and each spatial unit in the group of spatial units is tested to determine which decals intersect the spatial unit. To do so, an initial list of decals associated with a given game space is tested. Once a subset of decals for a given spatial unit is identified, that spatial unit is subdivided further into smaller spatial units. The smaller spatial units are tested again, however, instead of using the initial list of decals, only the smaller subset of decals that was identified is used. The iterative process of subdividing the spatial units into smaller and smaller spatial units and testing each spatial unit continues until a given (higher) resolution is reached for the game space.

20 Claims, 7 Drawing Sheets

(56) References Cited

U.S. PATENT DOCUMENTS

| | | |
|---|---|---|
| 5,563,946 A | 10/1996 | Cooper |
| 5,685,775 A | 11/1997 | Bakoglu |
| 5,706,507 A | 1/1998 | Schloss |
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,184,888 B1 * | 2/2001 | Yuasa .................... G06T 15/10 345/419 |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |

(56) References Cited

U.S. PATENT DOCUMENTS

| | | |
|---|---|---|
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,007,379 B1* | 4/2015 | Shafer ............... G06T 11/40 |
| | | 345/473 |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2005/0266921 A1* | 12/2005 | Hayashida ............ A63F 13/10 |
| | | 463/33 |
| 2007/0270215 A1* | 11/2007 | Miyamoto ............ A63F 13/45 |
| | | 463/32 |
| 2008/0143722 A1* | 6/2008 | Pagan .................. A63F 13/10 |
| | | 345/427 |
| 2009/0113448 A1 | 4/2009 | Smith |
| 2014/0038708 A1* | 2/2014 | Davison ............... A63F 13/69 |
| | | 463/31 |
| 2014/0344725 A1 | 11/2014 | Bates |
| 2015/0258439 A1* | 9/2015 | Prosin ................. A63F 13/00 |
| | | 463/31 |
| 2015/0273333 A1* | 10/2015 | Ciszewski ........... A63F 13/47 |
| | | 463/31 |
| 2016/0191671 A1 | 6/2016 | Dawson |
| 2017/0301135 A1* | 10/2017 | Jagnow ............... G06T 19/003 |
| 2018/0160049 A1* | 6/2018 | Aizawa ............... H04N 23/69 |
| 2019/0005712 A1* | 1/2019 | Nevraev ............... G06T 15/60 |
| 2019/0073747 A1* | 3/2019 | Burch ................. G06T 15/04 |
| 2019/0080495 A1* | 3/2019 | Andronikos ......... G06T 11/60 |
| 2020/0293176 A1* | 9/2020 | Yoganandan ....... G06F 3/04815 |
| 2020/0357163 A1* | 11/2020 | Wang ................. G06F 3/04815 |
| 2021/0117070 A1* | 4/2021 | Muta .................. A63F 13/422 |
| 2022/0261953 A1* | 8/2022 | Li ....................... G06T 3/40 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |

(56) References Cited

FOREIGN PATENT DOCUMENTS

| | | |
|---|---|---|
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

\* cited by examiner

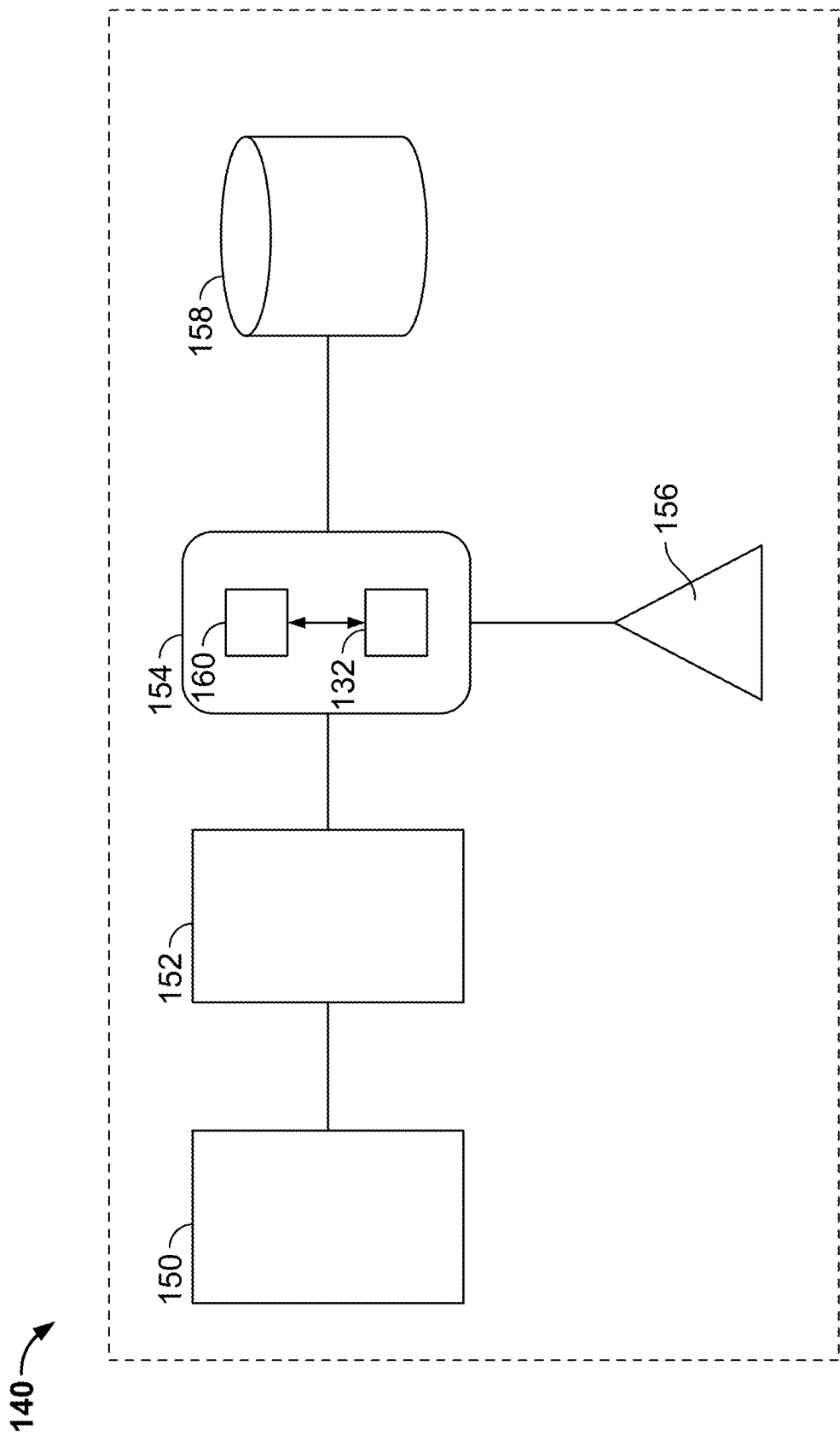

METHODS AND SYSTEMS FOR DETERMINING DECAL PROJECTIONS INTERSECTING SPATIAL UNITS IN A FRAME OF A GAME SPACE

CROSS-REFERENCE

The present application relies on, for priority, U.S. Patent Provisional Application No. 63/131,966, titled "Methods and Systems for Determining Decal Projections Intersecting Pixels in a Frame of a Game Space" and filed on Dec. 30, 2020. The above-referenced application is herein incorporated by reference in its entirety.

FIELD

The present specification is related generally to the field of video games and computer graphics. More specifically, the present specification is related to efficiently determining decal projections that intersect spatial units of a frame being rendered.

BACKGROUND

In video games, there are places in the virtual landscape in which a high-detail or patterned object or landscape may need to contact a low-detail object or landscape. In such scenarios, to enhance realistic visuals, it is desirable to address an abrupt visual transition from the low-detail object or landscape to the high-detail object or landscape without significantly increasing the time required to author objects and environments, without degrading the frame rate of the render, and without consuming significant computer memory and processing resources.

In computer graphics, decals are visual representations that are often used for their aesthetic value such as, for example, to transfer a pattern, a text, a glyph, or a symbol, from a 2D image to a 3D surface upon contact in game scenes. When decals are projected into a game scene, they interact with the scene's lighting and wrap around solid objects and meshes. Stated differently, a decal projection is a virtual shape (like a box) that is used to cover another part of a virtual landscape and direct a projection of some graphic onto that part of the virtual landscape. Among other functions, decal projections can serve to mask transitions from low-detail world geometry patches to high-detail 3D models.

FIG. 5A shows a game scene 500 without projected decals. A left portion 505 of the scene shows a low-detail world geometry patch transitioning abruptly into a second portion 510 having a high-detail landscape. On the other hand, FIG. 5B shows the same game scene 500 with decal projections, in accordance with some embodiments of the present specification. The transition from the low-detail world geometry patch of the left portion 505 to the high-detail landscape of the second portion 510 is hardly discernible after decals are applied.

However, a typical field of view of a virtual camera may have hundreds and thousands of decal projections. Evaluating so many decal projections for every spatial unit in order to determine what is being projected onto the spatial unit, and therefore how the spatial unit should be shaded during rendering of a frame, often have prohibitive computational costs and may lead to rendering performance degradation.

Accordingly, there is a need for systems and methods that enable computationally efficient determination of which decals intersect or are being projected onto which spatial unit(s) when rendering a frame of the game and during the shading of a spatial unit.

SUMMARY

The following embodiments and aspects thereof are described and illustrated in conjunction with systems, tools and methods, which are meant to be exemplary and illustrative, not limiting in scope. The present application discloses numerous embodiments.

In some embodiments, the present specification discloses a method of shading spatial units during rendering of a frame of a game space in a multiplayer video game, wherein the game space is implemented on a plurality of player client devices by at least one server in data communication with the plurality of player client devices over a network, the method being implemented by the at least one server executing a plurality of programmatic instructions and comprising: acquiring a number of pixels in a field of view of a virtual camera associated with the game space, wherein the field of view has an associated plurality of decal projections; generating one or more groups of spatial units by progressively dividing the field of view, wherein the one or more groups of spatial units range from a lowest resolution group of spatial units through one or more intermediate resolution groups of spatial units to a highest resolution group of spatial units, and wherein each group of the one or more groups of spatial units represents a higher resolution compared to an immediately previous group of spatial units, and wherein each spatial unit has a predefined number of pixels acquired from the field of view of the virtual camera associated with the game space; testing each spatial unit of a lowest resolution group of spatial units to determine a subset of decal projections, of the plurality of decal projections, that intersect each spatial unit of the lowest resolution group of spatial units; iteratively testing each spatial unit of a next higher resolution group of spatial units to determine a next subset of decal projections using the subset of decal projections determined for the immediate previously tested lower resolution group of spatial units, wherein the iterative testing determines which of the subset of decal projections intersect the spatial unit of the next higher resolution group of spatial units, and wherein the iterative testing ends with testing of each spatial unit of the highest resolution group of spatial units to determine a final subset of decal projections that intersect each spatial unit of the highest resolution group of spatial units; and shading spatial units using the final subset of decal projections per spatial unit.

Optionally, the field of view is progressively divided based on a predefined divisor, and wherein the divisor is a natural number greater than 1.

Optionally, a number of decal projections in the subset of decal projections is less than the plurality of decal projections. Still optionally, a number of decal projections in the next subset of decal projections is less than the subset of decal projections.

Optionally, the testing is performed using Separating Axis Theorem.

Optionally, at least the final subset of decal projections is sorted, in ascending order, based on an identification number associated with each decal projection.

Optionally, if a spatial unit, of the one or more groups of spatial units, is determined to be devoid of intersecting decals then no further tests are conducted for higher resolution spatial units encapsulated by the spatial unit.

Optionally, each spatial unit has a length comprising a first predefined number of pixels, a width comprising a second predefined number of pixels, and a depth defined in terms of world space units representing a distance/depth into a world space corresponding to the game space of the multiplayer video game.

In some embodiments the present specification discloses a system for determining shading of spatial units during rendering a frame of a game space, the system comprising: at least one server in data communication with a plurality of player client devices over a network, wherein the at least one server implements the game space on the plurality of player client devices and is configured to: acquiring a number of pixels in a field of view of a virtual camera associated with the game space, wherein the field of view has associated a plurality of decal projections; generating one or more groups of spatial units by progressively dividing the field of view, wherein the one or more groups of spatial units range from a lowest resolution group of spatial units through one or more intermediate resolution groups of spatial units to a highest resolution group of spatial units, and wherein each group of the one or more groups of spatial units represents a higher resolution compared to an immediately previous group of spatial units, and wherein each spatial unit has a predefined number of pixels acquired from the field of view of the virtual camera associated with the game space; testing each spatial unit of a lowest resolution group of spatial units to determine a subset of decal projections, of the plurality of decal projections, that intersect the spatial unit of the lowest resolution group of spatial units; iteratively testing each spatial unit of a next higher resolution group of spatial units to determine a next subset of decal projections, of the subset of decal projections determined for the immediate previously tested lower resolution group of spatial units, that intersect the spatial unit of the next higher resolution group of spatial units, wherein the iterative testing ends with testing of each spatial unit of the highest resolution group of spatial units to determine a final subset of decal projections that intersect the spatial unit of the highest resolution group of spatial units; and using the final subset of decal projections per spatial unit during the shading of spatial units.

Optionally, the field of view is progressively divided based on a predefined divisor, and wherein the divisor is a natural number greater than 1.

Optionally, a number of decal projections in the subset of decal projections is less than the plurality of decal projections. Still optionally, a number of decal projections in the next subset of decal projections is less than the subset of decal projections.

Optionally, the testing is performed using Separating Axis Theorem.

Optionally, at least the final subset of decal projections is sorted, in ascending order, based on an identification number associated with each decal projection.

Optionally, if a spatial unit in a group of spatial units, of the one or more groups of spatial units, is determined to be devoid of intersecting decals then no further tests are conducted for smaller spatial units, encapsulated by the spatial unit, in higher resolution groups of spatial units.

Optionally, each spatial unit has a length comprising a first predefined number of pixels, a width comprising a second predefined number of pixels, and a depth defined in terms of world space units representing a distance/depth into a world space corresponding to the game space.

In some embodiments, the present specification discloses a method of determining shading of spatial units while rendering a frame of a game space, wherein the game space has an associated virtual camera defining a field of view of a plurality of pixels, the method being implemented in a computer having a processor and a random access memory, wherein the processor is in data communication with a display and with a storage unit, the method comprising: using the field of view to generate one or more groups of spatial units, wherein the one or more groups of spatial units range from a lowest resolution group of spatial units through one or more intermediate resolution groups of spatial units to a highest resolution group of spatial units, and wherein each group of the one or more groups of spatial units represents a higher resolution compared to an immediately previous group of spatial units, and wherein each spatial unit has a predefined number of pixels; for each spatial unit of a lowest resolution group of spatial units, determining a subset of decal projections that intersect the spatial unit of the lowest resolution group of spatial units; for each spatial unit of a next higher resolution group of spatial units, iteratively determining a next subset of decal projections, of the subset of decal projections determined for the immediate previous lower resolution group of spatial units, that intersect the spatial unit of the next higher resolution group of spatial units, wherein the iterative determining ends when for each spatial unit of the highest resolution group of spatial units a final subset of decal projections is determined that intersect the spatial unit of the highest resolution group of spatial units; and using the final subset of decal projections during the shading of spatial units.

Optionally, the one or more groups of spatial units are generated by progressively dividing the field of view by a predefined divisor, and wherein the divisor is a natural number greater than 1.

Optionally, a number of decal projections in the subset of decal projections is less than the plurality of decal projections.

Still optionally, a number of decal projections in the next subset of decal projections is less than the subset of decal projections determined for the immediate previous lower resolution group of spatial units.

Optionally, a Separating Axis Theorem is used to determine an intersection of decal projections with a spatial unit.

Optionally, at least the final subset of decal projections is sorted, in ascending order, based on an identification number associated with each decal projection.

Optionally, if a spatial unit in a group of spatial units, of the one or more groups of spatial units, is determined to be devoid of intersecting decals then smaller spatial units, encapsulated by the spatial unit, in higher resolution groups of spatial units are not processed for determining intersecting decal projections.

Optionally, each spatial unit has a length comprising a first predefined number of pixels, a width comprising a second predefined number of pixels, and a depth defined in terms of world space units representing a distance/depth into a world space corresponding to the game space.

In some embodiments, the present specification discloses a system for determining shading of spatial units while rendering a frame of a game space, wherein the game space has an associated virtual camera defining a field of view of a plurality of pixels, the system comprising: a computer having a processor and a random access memory, wherein the processor is in data communication with a display and with a storage unit, the computer configured to: using the field of view to generate one or more groups of spatial units, wherein the one or more groups of spatial units range from a lowest resolution group of spatial units through one or more intermediate resolution group of spatial units to a highest resolution group of spatial units, and wherein each group of the one or more groups of spatial units represents a higher resolution compared to an immediately previous group of spatial units, and wherein each spatial unit has a predefined number of pixels defined by the camera's field of view; for each spatial unit of a lowest resolution group of spatial units, determining a subset of decal projections that intersect the spatial unit of the lowest resolution group of spatial units; for each spatial unit of a next higher resolution group of spatial units, iteratively determining a next subset of decal projections, of the subset of decal projections determined for the immediate previous lower resolution group of spatial units, that intersect the spatial unit of the next higher resolution group of spatial units, wherein the iterative determining ends when for each spatial unit of the highest resolution group of spatial units a final subset of decal projections is determined that intersect the spatial unit of the highest resolution group of spatial units; and using the final subset of decal projections during the shading of spatial units. Optionally, the one or more groups of spatial units are generated by progressively dividing the field of view by a predefined divisor, and wherein the divisor is a natural number greater than 1.

Optionally, a number of decal projections in the subset of decal projections is less than the plurality of decal projections. Still optionally, a number of decal projections in the next subset of decal projections is less than the subset of decal projections determined for the immediate previous lower resolution group of spatial units.

Optionally, an intersection of decal projections with a spatial unit is determined based on Separating Axis Theorem.

Optionally, at least the final subset of decal projections is sorted, in ascending order, based on an identification number associated with each decal projection.

Optionally, if a spatial unit in a group of spatial units, of the one or more groups of spatial units, is determined to be devoid of intersecting decals then smaller spatial units, encapsulated by the spatial unit, in higher resolution groups of spatial units are not processed for determining intersecting decal projections.

Optionally, each spatial unit has a length comprising a first predefined number of pixels, a width comprising a second predefined number of pixels, and a depth defined in terms of world space units representing a distance/depth into a world space corresponding to the game space.

In some embodiments, the present specification discloses a method of shading spatial units during rendering of a frame of a game space in a multiplayer video game, wherein the game space is implemented on a plurality of player client devices by at least one server in data communication with the plurality of player client devices over a network, the method being implemented by the at least one server executing a plurality of programmatic instructions and comprising: acquiring a field of view of a virtual camera associated with the game space, wherein the field of view has an associated plurality of decal projections; generating one or more groups of spatial units within the field of view by progressively dividing the field of view, wherein the one or more groups of spatial units range from a lowest resolution group of spatial units through one or more intermediate resolution group of spatial units to a highest resolution group of spatial units, and wherein each group of the one or more groups of spatial units represents a higher resolution compared to an immediately previous group of spatial units, and wherein each spatial unit comprises a predefined number of pixels; testing each spatial unit of a lowest resolution group of spatial units to determine a subset of decal projections, of the plurality of decal projections, that intersect each spatial unit of the lowest resolution group of spatial units; iteratively testing each spatial unit of a next higher resolution group of spatial units to determine a next subset of decal projections using the subset of decal projections determined for the immediate previously tested lower resolution group of spatial units, wherein the iterative testing determines which of the subset of decal projections intersect the spatial unit of the next higher resolution group of spatial units, and wherein the iterative testing ends with testing of each spatial unit of the highest resolution group of spatial units to determine a final subset of decal projections that intersect each spatial unit of the highest resolution group of spatial units; and shading spatial units using the final subset of decal projections per spatial unit.

Optionally, the field of view is progressively divided based on a predefined divisor, wherein the divisor is a natural number greater than 1.

Optionally, a number of decal projections in the subset of decal projections is less than the plurality of decal projections. Optionally, a number of decal projections in the next subset of decal projections is less than the subset of decal projections.

The testing may be performed using Separating Axis Theorem.

Optionally, at least the final subset of decal projections is sorted, in ascending order, based on an identification number associated with each decal projection.

Optionally, if a spatial unit, of the one or more groups of spatial units, is determined to be devoid of intersecting decals, then no further tests are conducted for higher resolution spatial units encapsulated by the spatial unit.

Optionally, each spatial unit has a length comprising a first predefined number of pixels, a width comprising a second predefined number of pixels, and a depth defined in terms of world space units representing a distance/depth into a world space corresponding to the game space of the multiplayer video game.

In some embodiments, the present specification also discloses a system for determining shading of spatial units during rendering a frame of a game space, the system comprising: at least one server in data communication with a plurality of player client devices over a network, wherein the at least one server implements the game space on the plurality of player client devices and is configured to: acquiring a field of view of a virtual camera associated with the game space, wherein the field of view has associated a plurality of decal projections; generating one or more groups of spatial units by progressively dividing the field of view, wherein the one or more groups of spatial units range from a highest resolution group of spatial units through one or more intermediate resolution group of spatial units to a lowest resolution group of spatial units, and wherein each group of the one or more groups of spatial units represents a lower resolution compared to an immediately previous group of spatial units, and wherein each spatial unit comprises a predefined number of pixels; testing each spatial unit of a lowest resolution group of spatial units to determine a subset of decal projections, of the plurality of decal projections, that intersect the spatial unit of the lowest resolution group of spatial units; iteratively testing each spatial unit of a next higher resolution group of spatial units to determine a next subset of decal projections, of the subset of decal projections determined for the immediate previously tested lower resolution group of spatial units, that intersect the spatial unit of the next higher resolution group of spatial units, wherein the iterative testing ends with testing of each spatial unit of the highest resolution group of spatial units to determine a final subset of decal projections that intersect the spatial unit of the highest resolution group of spatial units; and using the final subset of decal projections per spatial unit during the shading of spatial units.

Optionally, the field of view is progressively divided based on a predefined divisor, wherein the divisor is a natural number greater than 1.

Optionally, a number of decal projections in the subset of decal projections is less than the plurality of decal projections. Optionally, a number of decal projections in the next subset of decal projections is less than the subset of decal projections.

The testing may be performed using Separating Axis Theorem.

Optionally, at least the final subset of decal projections is sorted, in ascending order, based on an identification number associated with each decal projection.

Optionally, if a spatial unit in a group of spatial units, of the one or more groups of spatial units, is determined to be devoid of intersecting decals, then no further tests are conducted for smaller spatial units, encapsulated by the spatial unit, in higher resolution groups of spatial units.

Optionally, each spatial unit has a length comprising a first predefined number of pixels, a width comprising a second predefined number of pixels, and a depth defined in terms of world space units representing a distance/depth into a world space corresponding to the game space.

In some embodiments, the present specification also discloses a method of determining shading of spatial units while rendering a frame of a game space, wherein the game space has an associated virtual camera defining a field of view of a plurality of spatial units, the method being implemented in a computer having a processor and a random access memory, wherein the processor is in data communication with a display and with a storage unit, the method comprising: using the field of view to generate one or more groups of spatial units, wherein the one or more groups of spatial units range from a highest resolution group of spatial units through one or more intermediate resolution group of spatial units to a lowest resolution group of spatial units, and wherein each group of the one or more groups of spatial units represents a lower resolution compared to an immediately previous group of spatial units, and wherein each spatial unit comprise a predefined number of pixels; for each spatial unit of a lowest resolution group of spatial units, determining a subset of decal projections that intersect the spatial unit of the lowest resolution group of spatial units; for each spatial unit of a next higher resolution group of spatial units, iteratively determining a next subset of decal projections, of the subset of decal projections determined for the immediate previous lower resolution group of spatial units, that intersect the spatial unit of the next higher resolution group of spatial units, wherein the iterative determining ends when for each spatial unit of the highest resolution group of spatial units a final subset of decal projections is determined that intersect the spatial unit of the highest resolution group of spatial units; and using the final subset of decal projections during the shading of each spatial unit.

Optionally, the one or more groups of spatial units are generated by progressively dividing the field of view by a predefined divisor, wherein the divisor is a natural number greater than 1.

Optionally, a number of decal projections in the subset of decal projections is less than the plurality of decal projections. Optionally, a number of decal projections in the next subset of decal projections is less than the subset of decal projections determined for the immediate previous lower resolution group of spatial units.

The intersection of decal projections with a spatial unit may be determined based on Separating Axis Theorem.

Optionally, at least the final subset of decal projections is sorted, in ascending order, based on an identification number associated with each decal projection.

Optionally, if a spatial unit in a group of spatial units, of the one or more groups of spatial units, is determined to be devoid of intersecting decals, then smaller spatial units, encapsulated by the spatial unit, in higher resolution groups of spatial units are not processed for determining intersecting decal projections.

Optionally, each spatial unit has a length comprising a first predefined number of pixels, a width comprising a second predefined number of pixels, and a depth defined in terms of world space units representing a distance/depth into a world space corresponding to the game space.

In some embodiments, the present specification also discloses a system for determining shading of spatial units while rendering a frame of a game space, wherein the game space has an associated virtual camera defining a field of view of a plurality of spatial units, the system comprising: a computer having a processor and a random access memory, wherein the processor is in data communication with a display and with a storage unit, the computer configured to: using the field of view to generate one or more groups of spatial units, wherein the one or more groups of spatial units range from a highest resolution group of spatial units through one or more intermediate resolution group of spatial units to a lowest resolution group of spatial units, and wherein each group of the one or more groups of spatial units represents a lower resolution compared to an immediately previous group of spatial units, and wherein each spatial unit comprises a predefined number of pixels; for each spatial unit of a lowest resolution group of spatial units, determining a subset of decal projections that intersect the spatial unit of the lowest resolution group of spatial units; for each spatial unit of a next higher resolution group of spatial units, iteratively determining a next subset of decal projections, of the subset of decal projections determined for the immediate previous lower resolution group of spatial units, that intersect the spatial unit of the next higher resolution group of spatial units, wherein the iterative determining ends when for each spatial unit of the highest resolution group of spatial units a final subset of decal projections is determined that intersect the spatial unit of the highest resolution group of spatial units; and using the final subset of decal projections during the shading of each spatial unit.

Optionally, the one or more groups of spatial units are generated by progressively dividing the field of view by a predefined divisor, wherein the divisor is a natural number greater than 1.

Optionally, a number of decal projections in the subset of decal projections is less than the plurality of decal projections. Optionally, a number of decal projections in the next subset of decal projections is less than the subset of decal projections determined for the immediate previous lower resolution group of spatial units.

The intersection of decal projections with a spatial unit may be determined based on Separating Axis Theorem.

Optionally, at least the final subset of decal projections is sorted, in ascending order, based on an identification number associated with each decal projection.

Optionally, if a spatial unit in a group of spatial units, of the one or more groups of spatial units, is determined to be devoid of intersecting decals, then smaller spatial units, encapsulated by the spatial unit, in higher resolution groups of spatial units are not processed for determining intersecting decal projections.

Optionally, each spatial unit has a length comprising a first predefined number of pixels, a width comprising a second predefined number of pixels, and a depth defined in terms of world space units representing a distance/depth into a world space corresponding to the game space.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 1B is a block diagram illustration of an offline gaming system or environment, in accordance with some embodiments of the present specification;

DETAILED DESCRIPTION

Figure 1A:
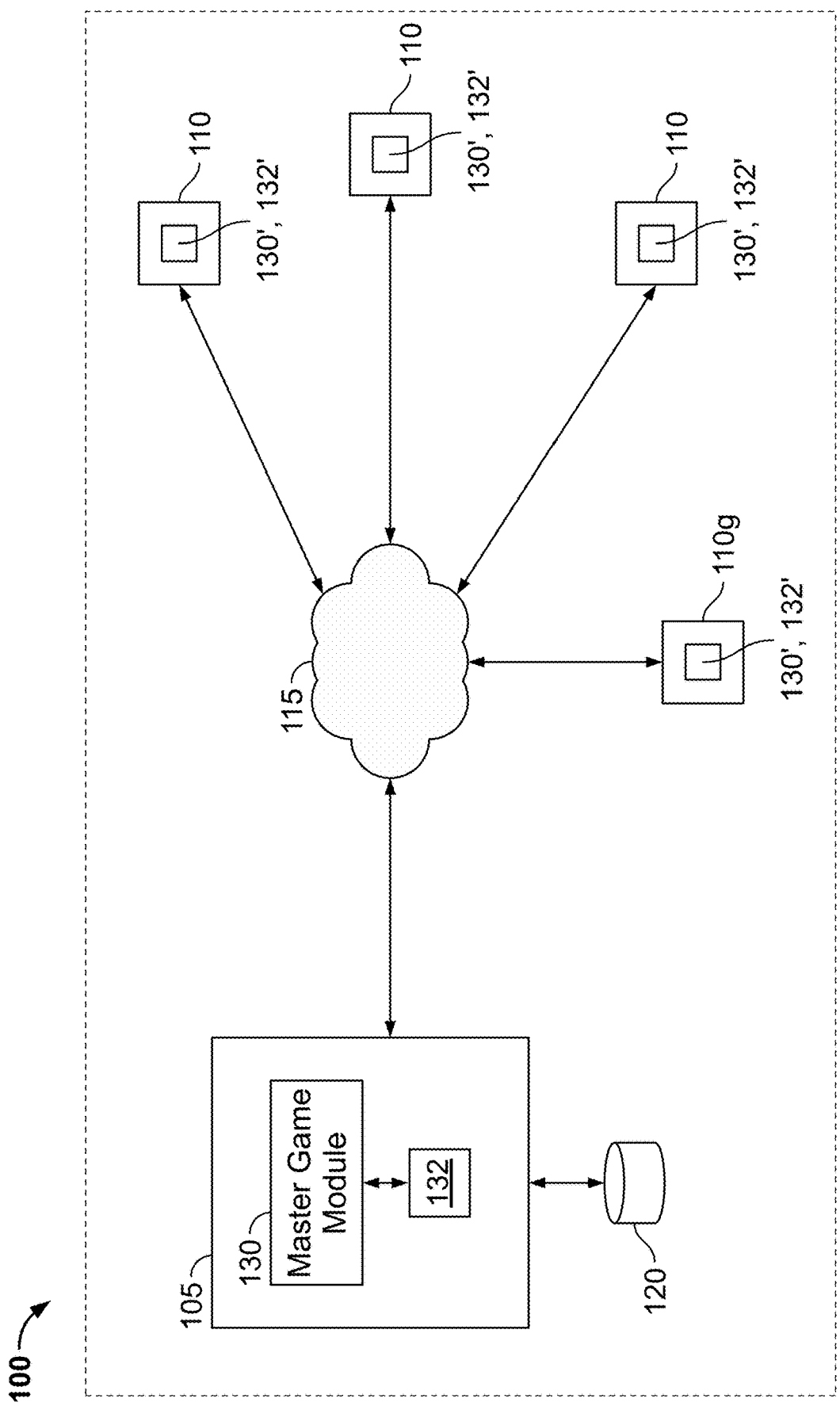
FIG. 1A is a block diagram illustration of a multi-player online gaming system or environment, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software. It should be appreciated that every method, step, process or action described herein is achieved by using the hardware, within the overall computing architecture, to execute one or more of the programmatic instructions.

The term "module", "application" or "engine" used in this disclosure refers to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "decal" used in this disclosure refers to a well-defined geometric shape, preferably a box, with 8 vertices and parallel faces. Edges of a decal can be of different lengths. A single decal volume is typically made of multiple images, such as a color map, a specular map, a normal map, a glossiness map, and/or an opacity map. Opacity map is a mask that allows artists to create smooth transition between decal and underlying world textures and, in particular, achieve a smooth fade out close to the boundaries of the decal volume's box which looks more appealing than hard-cut at the box's edge.

The term "Separating Axis Theorem (SAT)" used in this disclosure refers to a theorem which states that two convex geometries do not overlap or intersect if there exists a line (referred to as an axis) onto which the two geometries' projections do not overlap. Thus, SAT enables testing whether two convex geometries intersect or not.

The term "spatial unit" or "spatial subunit" refers to a volume of game space defined by a length comprising a first amount of pixels, a width comprising a second amount of pixels, and a depth extending into the virtual game space, where the first amount of pixels may equal the second amount of pixels or may be different than the second amount of pixels. The term "spatial unit" or "spatial subunit" therefore encompasses a set of pixels and may also be referred to as a cell.

The terms "low resolution", "lower resolution" and/or "lowest resolution" used in this disclosure with reference to a grid or group of spatial units are indicative of a relatively large size of spatial units in the group compared to a given resolution of a display screen or that of a camera field of view. On the other hand, the terms "high resolution", "higher resolution" or "highest resolution" used in this disclosure with reference to a group of spatial units may be indicative of a relatively small size of spatial units in the group.

The terms "grid" and "group" are used interchangeably in the present specification. In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Overview

FIG. 1A illustrates an embodiment of a multi-player online gaming or massively multiplayer online gaming system/environment 100 in which the systems and methods of the present specification may be implemented or executed. The system 100 comprises client-server architecture, where one or more game servers 105 are in communication with one or more client devices 110 over a network 115. Players and non-players, such as an administrator, may access the system 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although four client devices 110 are illustrated in FIG. 1A, any number of client devices 110 can be in communication with the one or more game servers 105 over the network 115.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 120. The database system 120 stores a plurality of game data associated with at least one game that is served or provided to the client devices 110 over the network 115. In some embodiments, the one or more game servers 105 may be implemented by a cloud of computing platforms operating together as game servers 105.

In accordance with aspects of the present specification, the one or more game servers 105 provide or implement a plurality of modules or engines such as, but not limited to, a master game module 130 and a spatial acceleration structure (SAS) module 132. The one or more client devices 110 are configured to implement or execute one or more of a plurality of client-side modules some of which are same as or similar to the modules of the one or more game servers 105. In some embodiments each of the player and non-player client devices 110 executes a client-side game module 130' (also referred to as—client game module 130') that may further integrate a client-side SAS module 132'. In some embodiments, however, the client-side SAS module 132' may not be required and all processes related to the spatial acceleration structure functionality may be implemented at the one or more game servers 105.

In some embodiments, the at least one non-player client device 110g is used by an administrator to log into the one or more game servers 105 (via the client game module 130') and execute the module 132 on the server to generate one or more GUIs that enable the administrator to customize and set one or more parameters, attributes or characteristics related to the spatial acceleration structure. For example, the one or more GUIs may be used to predefine a value of a divisor 'd' in order to generate the spatial acceleration structure. It should be appreciated that the administrator includes computer graphics designers or artists, members of visual effects teams, gameplay engineers and any other non-player personnel responsible for design and development of the game.

While various aspects of the present specification are being described with reference to functionalities or programming distributed across modules or engines 130 and 132, it should be appreciated that, in some embodiments, some or all of the functionalities or programming associated with these modules or engines may be integrated within fewer modules or in a single module—such as, for example, in the master game module 130 itself on the server side.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the client devices 110 and transmits updates to all client devices 110 based on the received game data so that the game, on each of the client devices 110, represents the most updated or current status with reference to interactions of all players with the game. Thus, the master game module 130 transmits game data over the network 115 to the client devices 110 for use and rendering by the game module 130' to provide local versions and current status of the game to the players.

On the client-side, each of the one or more player client devices 110 implements the game module 130' that operates as a gaming application to provide a player with an interface between the player and the game. The game module 130' generates the interface to render a virtual environment, virtual space, game space, map or virtual world associated with the game and enables the player to interact in the virtual environment to perform a plurality of game and other tasks and objectives. The game module 130' accesses at least a portion of game data, received from the game server 105, to provide an accurate representation of the game to the player. The game module 130' captures and processes player inputs and interactions within the virtual world or environment and provides at least a portion as updates to the game server 110 over the network 115.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations.

While the embodiments of the present specification will be illustrated with reference to the multi-player online gaming or massively multiplayer online gaming system/environment 100 of FIG. 1A, the embodiments are equally applicable to offline gaming environments such as the system/environment 140 of FIG. 1B. As shown in FIG. 1B, the system 140 includes a display 150, graphics hardware 152, a computing platform 154, a user interface 156 and a storage device, unit or memory 158. The computing platform 154 includes a processor and random access memory as well as components for processing data in order to render the game space or virtual environment, such as a graphics system 160 and the SAS module 132.

The graphics system 160 may perform rendering operations based on the results of the SAS module 132. The rendering operations, performed by the graphics system 160, may include visibility, culling, tessellation and spatial unit shading operations, for example. Based on results of the rendering operations, commands (such as Open GL commands) may be issued by graphics system 160 to the graphics hardware 152 to cause a display of a rendered frame on display 150.

Decals and Decal Projections

Figure 3:
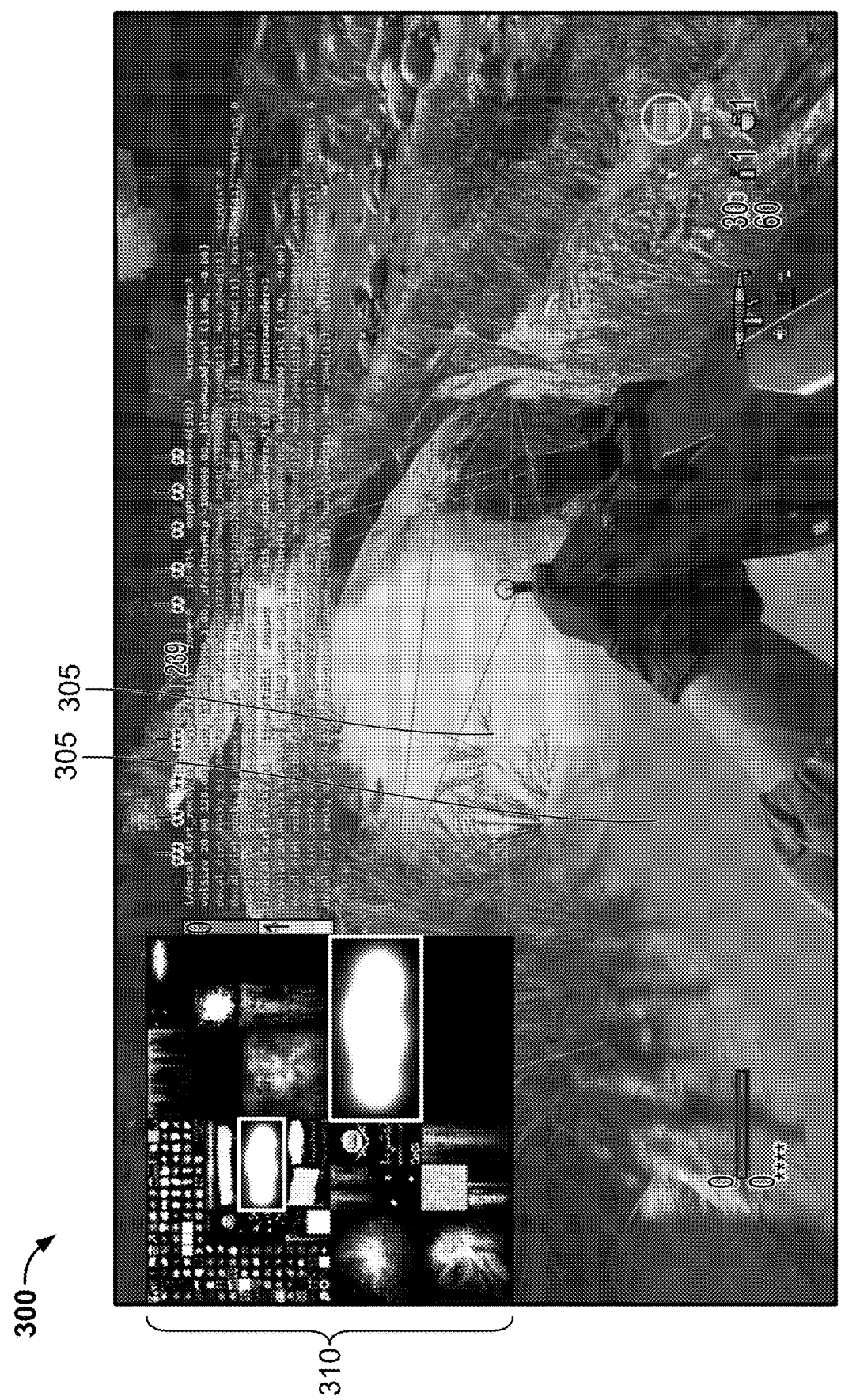
FIG. 3 illustrates a game space frame showing highlighted boxes and areas where decals have effect, in accordance with some embodiments of the present specification.

Decal projections typically involve programmatically acquiring a two-dimensional (2D) texture (like worn down looking wood, for example) and projecting it onto a virtual three-dimensional (3D) surface (like a staircase, for example). A video game artist may define a decal projection by generating an appropriately sized 3D box in the virtual environment. The 3D box is defined by three axes (x, y and z). A 2D image is then projected along the z axis onto the 3D geometry. As an example, FIG. 3 illustrates a game space frame 300 showing highlighted boxes and areas 305 where decals have a visual effect, in accordance with some embodiments of the present specification.

When rendering a frame of the game and during the shading of a spatial unit, a world space position, based on a world coordinate system, of the spatial unit is reconstructed. In embodiments, a world space position is a position in a 3-dimensional coordinate space having three coordinates (X, Y, Z). In an embodiment, with reference to a video game, a camera position is considered as the origin of world space position and is designated the coordinates (0,0,0). Positions of all other objects in the game are specified/designated coordinates in the same 3D space with reference to the camera position coordinates.

The spatial unit has a world space position that may intersect a decal volume and shading of the spatial unit would need to be performed based on its position in the decal volume. Therefore, the world space position is used to find 3D position of the spatial unit within the decal's bounding box (volume). Positions within the 3D box has X, Y, and Z coordinates, however, the game textures are two dimensional. Hence, 3D position in decal volumes' frame of reference is finally converted to 2D texturing coordinates by dropping/ignoring the Z-coordinate. This process of dropping z-component of the 3D position is called plane projection, wherein all points within the decal volume/box are projected onto the XY plane.

The XY coordinates undergo couple transformations and are used to sample 2D texture. In embodiments, couple transformations comprise scaling, rotating and translating the obtained 2D texture coordinates to achieve a required aesthetic look. This is presented to game design artists in the form of three parameters, namely: X and Y scale, angle rotation around Z axis and X and Y translation. The couple transformations are applied to the obtained 2D texture coordinates in a 2D texture coordinate space.

In some embodiments, 2D textures are stored in a large 2D texture atlas—such as the atlas 310 visible on the left side of the frame 300 of FIG. 3.

As known to persons of ordinary skill in the art, pixel/unit shading is a method used for rendering various graphical features in a frame. As is known, shading involves executing a software program per fragment/pixel/vertex or other user defined data unit, which causes various graphical features to be rendered in a frame on a screen. Video games often utilize spatial unit shaders in conjunction with GPUs (Graphics Processing Units) to render these graphical features on a per pixel basis. A spatial unit shader, also known as a fragment shader, is a software program that dictates the color, brightness, contrast, and other graphical features or characteristics of a single spatial unit (fragment). For instance, if a spatial unit to be rendered is on a visible surface of a pyramid, factors affecting its appearance comprise:

The light sources that illuminate this fragment of the pyramid and the types of light sources. In addition, the color of the light is a factor.

The visual appearance of specular reflections of the pyramid's surface material and whether it reflects light sharply such as metal or whether it diffuses light, such as plastic.

Whether there is a texture mapped to the surface? If so, the corresponding spatial unit in the texture's bitmap may contribute to the color of the fragment.

Whether there is a bump associated with the surface of the pyramid? If so, a bitmap or mathematical procedure affects the brightness of the light to simulate a bumpy texture on the surface.

Whether the surface is partially transparent and whether there are partially transparent objects between the pyramid and the camera.

Whether any other objects cast shadows on the pyramid.

Thus, a spatial unit shader is a graphics function that determines visual effects on a per-spatial unit basis. Depending on resolution, millions of pixels in a plurality of spatial units may need to be rendered, lit, shaded, and colored for each frame, at, for example, 60 frames per second. This creates a tremendous computational load. Further, a typical camera field of view or frustum may have hundreds and thousands of decal projections. Testing all decal projections for every pixel, in order to determine what is being projected onto a pixel and therefore how the pixel or a corresponding spatial unit should be shaded, has prohibitive computational and performance costs. To address these issues, the systems 100, 140 of FIGS. 1A and 1B implement the SAS module 132, which is described in further detail below.

Spatial Acceleration Structure (SAS) Module 132

In accordance with some aspects of the present specification, the SAS module 132 implements a plurality of instructions or programmatic code to subdivide an entire camera frustum (region of space in the modeled world that may appear on a display screen and is a field of view of a perspective virtual camera) into groups of spatial units. In embodiments, each spatial unit has a length comprising a first predefined number of pixels, and a width comprising a second predefined number of pixels, wherein the second predefined number of pixels may or may not be the same as the first predefined number of pixels. Further, each spatial unit has a depth defined in terms of world space units which depends upon the spatial unit's position in the world space as described above, and represents a distance/depth into the world space. For example, in an exemplary embodiment, a spatial unit may have a length and width of 32 pixels each and a depth of 1 meter (depth into the game world) on the world coordinate system.

To begin with, the camera field of view (frustum) is divided into a group of large spatial units (representing a low resolution). Each large spatial unit comprises a plurality of smaller spatial units. In embodiments, each large spatial unit has a first length, width and depth into the world space, while each comprising spatial unit has a second length, width and depth into the world space. For example, a scene may be divided into 8 (width)×5 (length)×4 (depth) spatial units, where each spatial unit is, for example, 32 pixels (width)×32 pixels (length)×1 meter (depth). In embodiments, each spatial unit is tested to determine which decal projections intersect the spatial unit. To do so, an initial list of decals associated with a given game space is tested using an approach such as, but not limited to, the Separating Axis Theorem (SAT). In an embodiment, an approximation method is used for testing the decals associated with a given game space. The method comprises approximating spatial unit and decal projection with a sphere and performing an intersection test of two such spheres. This comprises comparing distance between the centers of the two sphere by using the radii of said spheres. In another embodiment, spatial unit and decal projections are approximated by using axis-aligned bounding boxes, as this method provides, in some instances, an increased accuracy as compared to the method comprising intersection test of two such spheres. In embodiments, SAT is used for testing decals associated with a given game space, as SAT provides accurate results while avoiding any false positives. In an embodiment the SAT based tests are performed within the world space coordinates.

Once a subset or shortlist of decals for a given spatial unit is identified, that spatial unit is subdivided further into smaller spatial units (representing a higher resolution). The smaller spatial units are tested again, however, instead of using the initial larger list of decals, only the smaller subset or shortlist of decals that was identified is used. The iterative process of subdividing the spatial units into smaller and smaller spatial units and testing each spatial unit continues until a given resolution is reached for the game space. Thus, the SAS module 132 is configured to implement a spatial acceleration grid or structure of spatial units that enables testing fewer and fewer decals as the module subdivides from larger to smaller and smaller spatial units (that is, moving from lower resolution to higher resolution).

Figure 2:
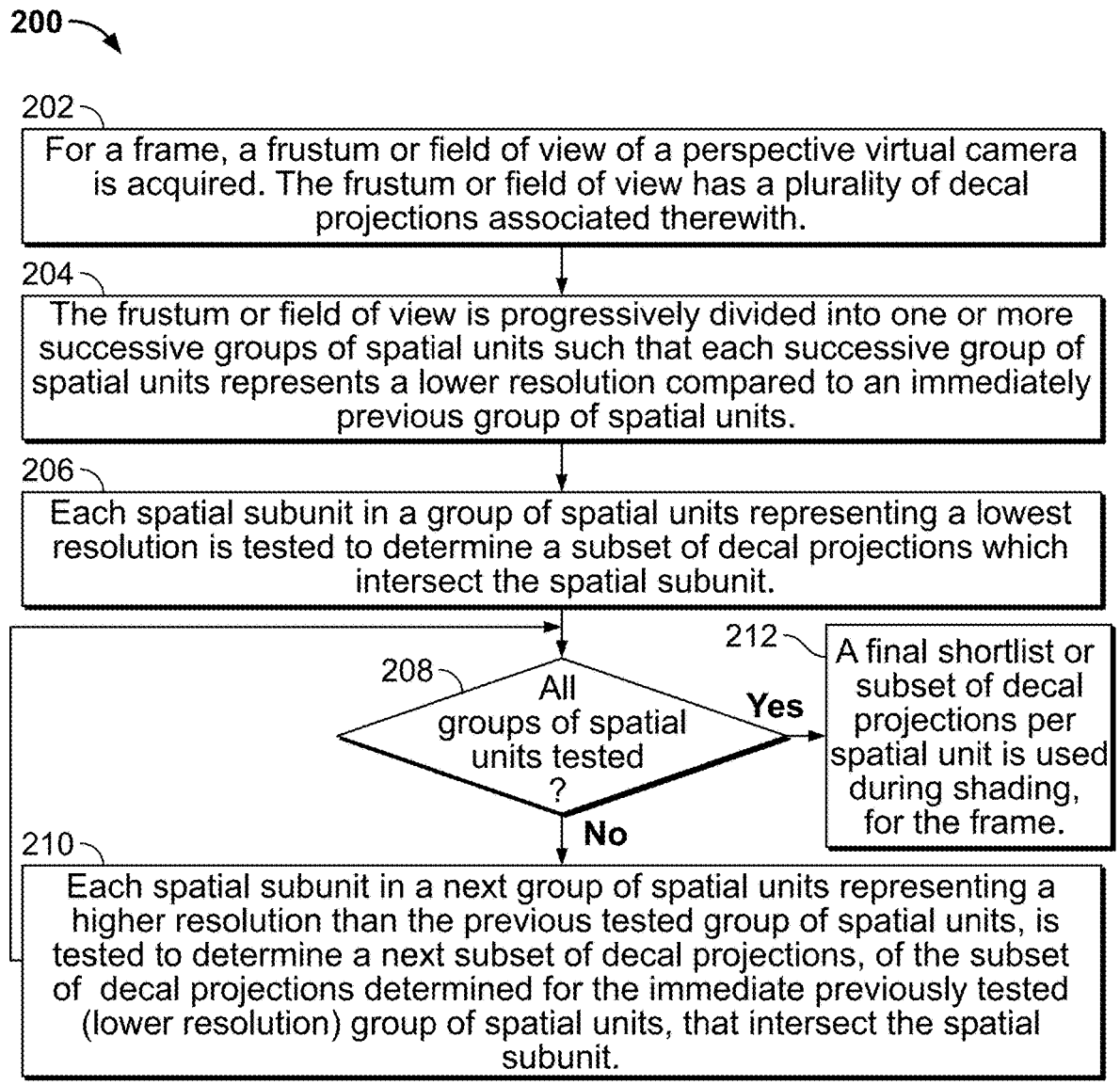
FIG. 2 is a flowchart of a plurality of exemplary steps of a method of determining one or more decal projections that intersect a spatial unit, in a game space, by generating a spatial acceleration grid, structure or groups of spatial sub-units, in accordance with some embodiments of the present specification.

FIG. 2 is a flowchart of a plurality of exemplary steps of a method 200 of determining one or more decal projections that intersect a spatial unit, in a game space, by generating a spatial acceleration grid, structure or groups of spatial units, in accordance with some embodiments of the present specification. In embodiments, the method 200 is implemented by the SAS module 132 in any of the systems 110, 140 of FIGS. 1A and 1B.

At step 202, for a frame, a frustum or field of view of a perspective virtual camera is acquired. In some embodiments, the frustum defines the game space in a simulated virtual environment that may be displayed on a screen of a player's client device. In embodiments, the frustum or field of view has a plurality of decals associated therewith. In some embodiments, each of the plurality of decals has an associated identification number. Thus, in various embodiments, decals are placed in a game map with associated world position and size. When a frame is rendered, the decals in the game map are iterated to identify which decals are visible to (or lay in the field of view of) the virtual camera.

In various embodiments, the frustum or field of view encompasses a resolution or a number of pixels (hereinafter referred to as 'total' resolution or 'total' number of pixels) of the screen of the player's client device. In various embodiments, the total resolution of the screen is represented as m×n pixels, wherein 'm' denotes a number of pixels along a width dimension of the screen and 'n' denotes a number of pixels along a height dimension of the screen. For example, in some embodiments, a total resolution of a screen may be 720×480 pixels, 720×576 pixels, HD (High Definition) having 1280×720 pixels, Full HD having 1920×1080 pixels, Quad HD having 2560×1440 pixels, Ultra HD having 3840×2160 pixels or any other resolution known to persons of ordinary skill in the art.

At step 204, the frustum, field of view, total resolution or the total number of pixels is progressively divided into one or more successive groups of spatial units, wherein each successive groups of spatial units represents a smaller area (block of pixels) than the previous group of spatial units, such that each successive group or sub-division of spatial units represents a higher resolution compared to an immediately previous group of spatial units. In embodiments, the one or more successive groups of spatial units range from a largest (that is, lowest resolution) group of spatial units to a smallest, (that is highest resolution) group of spatial units, having increasing resolution with each iterative sub-division.

In various embodiments, each spatial unit of a group of spatial units includes a predefined number of pixels, such as, p×q pixels, wherein 'p' denotes a number of pixels along a width dimension of a spatial unit and 'q' denotes a number of pixels along a height dimension of the spatial unit. Further, each spatial unit is characterized by a depth (display screens are flat but a projection needs to extend into the screens). Consequently, each spatial unit of a group of spatial units includes p×q×r pixels, wherein 'r' denotes the depth in terms of a number of pixels. In some embodiments, p is equal to q is equal to r. For example, in some embodiments, each spatial unit of a group of spatial units includes 32×32×32 pixels (that is, p=q=r=32). In various embodiments, the one or more successive groups of spatial units are determined by progressively dividing the total number of pixels by multiples of a predefined divisor 'd'. In some embodiments, the divisor is a natural number greater than 1, such as 2, 3, 4, 5 or any other natural number.

For example, a first group of spatial units, representative of a highest, or first resolution, has 'm/p×n/q×r' spatial units ('m/p' being the width, 'n/q' being the height and 'r' being the depth of the cluster). A successive second group of spatial units, representative of a second resolution (the second resolution being lower than the first resolution), has 'm/(p*d)×n/(q*d)×r/d' spatial units. A successive third group of spatial units, representative of a third resolution (the third resolution being lower than the second resolution), has 'm/(p*$d^2$)×n/(q*$d^2$)×r/$d^2$' spatial units. Similarly, a successive fourth group of spatial units, representative of a fourth resolution (the fourth resolution being lower than the third resolution), has 'm/(p*$d^3$)×n/(q*$d^3$)×r/$d^3$' spatial units, and so on. This example illustrates a case of moving from a highest resolution group of spatial units to a lowest resolution group of spatial units.

It should be appreciated that when generating the first, second, third and fourth group of spatial units, division of a number of pixels by the divisor 'd' may result in a non-integer number of pixels. For example, m/(p*d), n/(q*d) and/or r/d may be non-integer values. In such scenarios the resulting non-integer number of pixels is rounded up or down to an integer number.

It should be appreciated that it is not necessary to generate a specific number (for example, four in the present example) of groups of spatial units. In alternate embodiments, lesser or more number of groups of spatial units may be generated. In embodiments, the number of groups of spatial units generated depends on a screen resolution. The higher the screen resolution, the more groups are generated. For example, doubling the screen resolution corresponds to adding one more spatial unit group and, similarly, halving the resolution corresponds to removing one spatial unit group. In an embodiment, for a screen resolution of 1920× 1080, an optimal number of spatial unit groups is determined as four. In various embodiments, depending on an actual screen resolution used, the determined optimal number of groups may be increased or decreased.

Choice of the predefined divisor depends at least upon the total resolution (the total number of pixels), the plurality of decals associated with the camera field of view, and the total number of groups of spatial units desired to be generated to optimize the time required to render authored objects and environments without consuming significant computer memory and processing resources.

The method 200 describes determining one or more decal projections that intersect a spatial unit, in a game space, beginning by testing the decals against a lowest resolution group of spatial units and then, subsequently testing against higher and higher resolution group of spatial units until a highest resolution group of spatial units is reached.

At step 206, each spatial unit in a first group of spatial units, representing the lowest resolution is tested, checked or analyzed to determine a subset of decal projections, of the plurality of decal projections, which intersect the spatial unit. In some embodiments, the decal projections are tested using the Separating Axis Theorem (SAT) in order to determine the subset of decal projections intersecting each spatial unit. It should be appreciated that the number of decal projections in the subset are less than the plurality of decal projections. In some embodiments, the subset of decal projections is sorted, in ascending order, based on the identification number associated with each decal projection.

Continuing with the example, each spatial unit in the first group of spatial units, representative of the first resolution (that is, the lowest resolution in the example), is tested to determine a first subset of decal projections, of the plurality of decal projections, that intersect the spatial unit. Assume, for illustration, that the camera field of view encompasses 'N' number of decals and that all decals are evenly distributed to every spatial unit in a group of spatial units. Therefore, the first group of spatial units requires m/(p*$d^3$)× n/(q*$d^3$)×r/$d^3$×N tests. After performing these many tests, every spatial unit in the first group of spatial units has a first subset of decals $N_{D1}$=N/(m/(p*$d^3$)×n/(q*$d^3$)×r/$d^3$) decals. If the first subset is a non-integer number then it is rounded up or down. It should be appreciated that $N_{D1}$<N. In embodiments, $N_{D1}$ is an average number of decals per spatial unit and, since it is rarely a multiple of number of spatial units, after every step, $N_{D1}$ is rounded up in order to avoid a situation where, after a few steps, the number of decal projections becomes zero.

At step 208, it is determined if all of the one or more groups of spatial units have been tested for intersection with decal projections. If not, then, at step 210, each spatial unit in a next group of spatial units, representing a higher resolution than the already tested group of spatial units, is tested to determine a next subset of decal projections, of the subset of decal projections determined for the immediate previously tested (lower resolution) group of spatial units, that intersect the spatial unit. In other words, the subset of decal projections, determined for the immediate previously tested (lower resolution) group of spatial units, is tested for intersection with each spatial unit of the next higher resolution group of spatial units. That is, the next group of spatial units is tested with the shortlist or subset of intersecting decal projections determined for the immediate previously tested group of spatial units. Thus, the next group of spatial units is being tested with fewer number of decal projections compared to the previous group of spatial units. In some embodiments, the next subset of decal projections is sorted, in ascending order, based on the identification number associated with each decal projection.

Thereafter, as part of an iterative process, the flow moves back to step 208. Continuing with the example, each spatial unit in the second group of spatial units, representative of the second resolution (that is, of higher resolution than that of the first group of spatial units), is tested to determine a second subset of decal projections, of the first subset of decal projections, that intersect the spatial unit.

Therefore, the second group of spatial units requires m/(p*$d^2$)×n/(q*$d^2$)×r/$d^2$×$N_{D1}$ tests. After performing these many tests, every spatial unit in the second group of spatial units has a second subset of decals $N_{D2}$=$N_{D1}$/$d^3$ decals, as each spatial unit is subdivided 'd' times along each of the three axes X, Y, Z, and decals are assumed to be evenly distributed to all spatial units of the next group. Again, if the second subset is a non-integer number then it is rounded up or down. It should be appreciated that $N_{D1}$<$N_{D1}$.

The iterative process (using steps 208 and 210) of testing decals for intersection with spatial units continues with successive groups of spatial units, wherein each of the successive groups of spatial units represents a higher resolution than that of an immediate previously tested group of spatial units. Test at each group of spatial units results in a shortlist or subset of intersecting decal projections per spatial unit wherein the shortlist or subset of intersecting decal projections per spatial unit is sorted, in ascending order, based on the identification number associated with each decal projection. As a result, every spatial unit has an associated short list of decals (e.g., less than a dozen) that potentially intersects pixels that fall into the spatial unit.

The resulting shortlist or subset of intersecting decal projections per spatial unit for a group of spatial units is used as input list of decal projections to be tested for a next/subsequent group of spatial units, wherein the next/subsequent group of spatial units is representative of a higher resolution compared to the immediate previously tested group of spatial units. Consequently, fewer and fewer number of decals are tested moving from the lowest resolution group of spatial units, through intermediate resolution group of spatial units (if any), to the highest resolution group of spatial units.

The iterative process of testing decals for intersection with spatial units continues until the highest resolution group of spatial units is reached. The testing of decals for intersection with each spatial unit of the highest resolution group of spatial units results in a final shortlist or subset of decals per spatial unit. In some embodiments, the final shortlist or subset of intersecting decal projections per spatial unit, is sorted, in ascending order, based on the identification number associated with each decal projection. In some embodiments, all determined shortlists or subsets of intersecting decal projections per spatial unit are sorted in ascending order at each stage of testing.

Continuing with the example, each spatial unit in the third group of spatial units, representative of the third resolution (that is, of higher resolution than that of the second group of spatial units), is tested to determine a third subset of decal projections, of the second subset of decal projections, that intersect the spatial unit. Therefore, the third group of spatial units requires $m/(p*d) \times n/(q*d) \times r/d \times N_{D2}$ tests. After performing these many tests, every spatial unit in the third group of spatial units has a third subset of decals $N_{D3}$. Again, if the third subset is a non-integer number then it is rounded up or down. It should be appreciated that $N_{D3} < N_{D2}$.

Finally, each spatial unit in the fourth group of spatial units, representative of the fourth resolution (that is, of highest resolution), is tested to determine a fourth subset of decal projections, of the third subset of decal projections, that intersect the spatial unit. Therefore, the fourth group of spatial units requires $m/p \times n/q \times r \times N_{D3}$ tests. After performing these many tests, every spatial unit in the fourth group of spatial units has a fourth subset of decals $N_{D4}$. Again, if the fourth subset is a non-integer number then it is rounded up or down. It should be appreciated that $N_{D4} < N_{D3}$. In the example, the fourth subset is the final shortlist or subset of decal projections per spatial unit.

If, at step 208, it is determined that all of the one or more groups of spatial units have been tested for intersection with decal projections then, at step 212, the (sorted) final shortlist or subset of decal projections per spatial unit is used during spatial unit shading, for the frame, and the method 200 terminates. Continuing with the example, the fourth subset of decal projections per spatial unit $N_{D4}$ is used during spatial unit shading.

As discussed, in some embodiments, the shortlist or subset of intersecting decal projections per spatial unit for each group of spatial units, is sorted in ascending order, based on the identification number associated with each decal projection. This enables faster spatial unit shading. In some embodiments, the output or resulting shortlist or subset of intersecting decal projections per spatial unit, for each group of spatial units, is stored in a flat array instead of a linked list. This also improves cache utilization, because during the iterative process (using steps 208 and 210) there is a high possibility that a next decal identification number (or index) is already in cache. Linked list tends to result in more random access patterns. Since decal projection counts per spatial unit vary greatly, for example, for a single frame, said counts may vary from zero to a couple of dozens, efficient implementation on graphics processing units might be very complex. Hence, in embodiments, the shortlist or subset of intersecting decal projections per spatial unit for each group of spatial units is sorted throughout during the processing process rather than at the end when a final list is obtained.

Persons of ordinary skill in the art would appreciate that, in practice, decals may not be evenly distributed across all spatial units. There may be spatial units with no decals at all and other spatial units with several decals. Therefore, in some embodiments, if a spatial unit in a group of spatial units is determined to be empty or devoid of intersecting decal projections (based on a test using the SAT) then no further tests are conducted for the smaller spatial units, encapsulated by the spatial unit. Thus, an entire hierarchy of tests is skipped for the spatial unit, thereby, further reducing the number of tests for determining intersecting decals.

In sum, the SAS module 132 implements a tile-rendered volume decal method 200 of FIG. 2, where: a) decals are applied to both object and world geometry during the spatial unit shading step of the render process; b) the decals are defined as planar projection volumes in the game space; c) the display screen or camera field of view is divided into at least one grid or group of spatial units (spatial acceleration structure); d) the decal volumes are rendered into the at least one grid during a preparatory render step to determine which decals are visible in which grid spatial units; and e) when rendering the object and world geometry within a spatial unit, the spatial unit shader considers only the decals visible in that spatial unit.

Stated differently, the SAS module 132 implements the method 200 of FIG. 2 in order to determine where and how decals intersect a spatial unit in in the virtual world space of the game. For this, the module 132 subdivides the virtual camera field of view into grids of spatial unit wherein every spatial unit intersects a number of world space pixels. Eventually, the module 132 is configured to generate a list of decals that intersect those spatial units. In various embodiments, as camera field of view changes, the module 132 builds the list of intersecting decals per frame by scratch.

An additional advantage is that the method 200 maps seamlessly to asynchronously compute on current generation GPUs. Cost of clustering (building a list of decal projections per spatial unit) is effectively free, because the computations related to clustering are scheduled at a time when the GPU has available free resources for computations.

Use Case Scenario

Described below is an exemplary use case scenario of the method 200 of FIG. 2. As explained earlier, in embodiments, each spatial unit has a length comprising a first predefined number of pixels, and a width comprising a second predefined number of pixels, and a depth defined in terms of world space units representing a distance/depth into the world space. For example, in an exemplary embodiment, a spatial unit may have a length and width of 32 pixels each and a depth of 1 meter (depth into the game world) on the world coordinate system. In a specific embodiment, a spatial unit may be defined in terms of a plurality of specific pixel dimensions. For example, a Full HD display screen of a player's client device is considered having a resolution of 1920×1080 pixels. That is, m=1920 and n=1080. This total number of pixels is divided into groups of spatial units such that each spatial unit has 32×32 pixels. That is, p=32 and q=32. To generate successive groups of spatial units, defined in terms of pixels, the divisor 'd' is chosen as 2. Consequently, the groups of spatial units are determined as follows:

First group of spatial units (representative of a lowest, or first resolution) has $m/(p*d^3) \times n/(q*d^3) \times r/d^3$ spatial units=1920/(32*8)×1080/(32*8)×32/8 spatial units=7.5×4.2×4=8×5×4 spatial units (7.5 and 4.2 being rounded up to integer numbers).

Second group of spatial units (representative of a second resolution higher than the first resolution) has $m/(p*d^2) \times n/(q*d^2) \times r/d^2$ pixels=1920/(32*4)×1080/(32*4)×32/4 pixels=15×8.4×8=15×9×8 pixels (8.4 being rounded up to an integer number).

Third group of spatial units (representative of a third resolution higher than the second resolution) has $m/(p*d) \times n/(q*d) \times r/d$ pixels=1920/(32*2)×1080/(32*2)×32/2 pixels=30×16.85×16=30×17×16 pixels (16.85 being rounded up to an integer number).

Fourth group of spatial units (representative of a fourth resolution higher than the third resolution) has m/p×n/q×r pixels=1920/32×1080/32×32 spatial units=60×34×32 pixels.

It is assumed that N=1000 and, to simplify calculations, that all decals for a group of spatial units are evenly distributed to every spatial unit. Iterative process of testing intersection of decals with each spatial unit progresses as follows:

Step 1: Testing for intersection of the decals with each spatial unit begins with the lowest resolution group of spatial units—that is, with the first group of spatial units. Consequently, the first group of spatial units requires 8×5×4×1000=160000 tests. After the tests, every spatial unit has a first subset of 1000/160=6.25=approximately 7 decals.

Step 2: Each spatial unit in the second group of spatial units is now tested only against the first subset of 7 decals from the parent spatial unit. Every spatial unit of the first group of spatial units encapsulates 8 spatial units of the second group of spatial units. Consequently, the second group of spatial units requires 15×9×8×7=7560 tests. After the tests, every spatial unit has a second subset of ⅞=0.875=approximately 1 decal (assuming even distribution).

Figure 4:
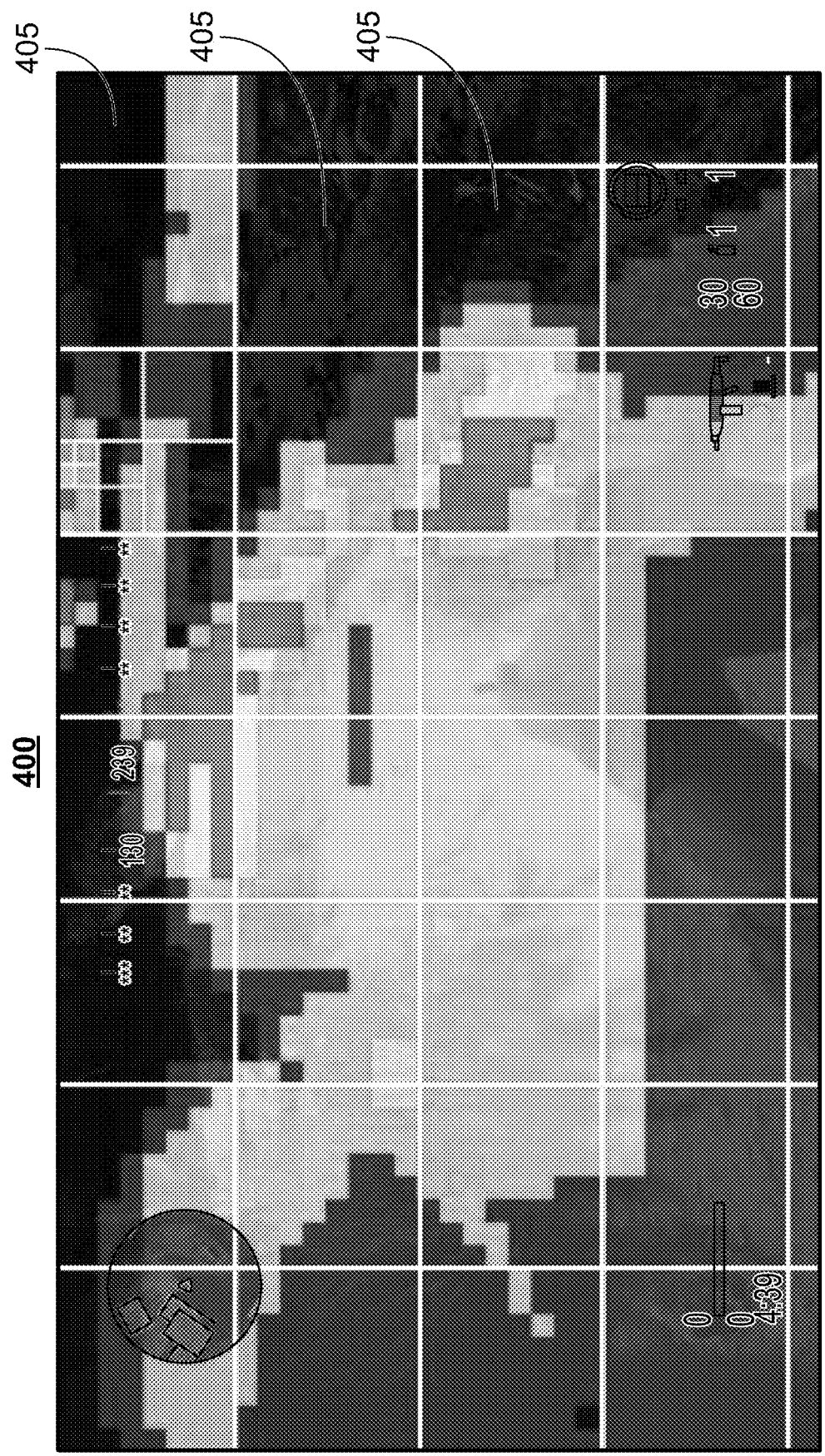
FIG. 4 illustrates the game space frame divided into a group of spatial units, in accordance with some embodiments of the present specification.
Figure 5A:
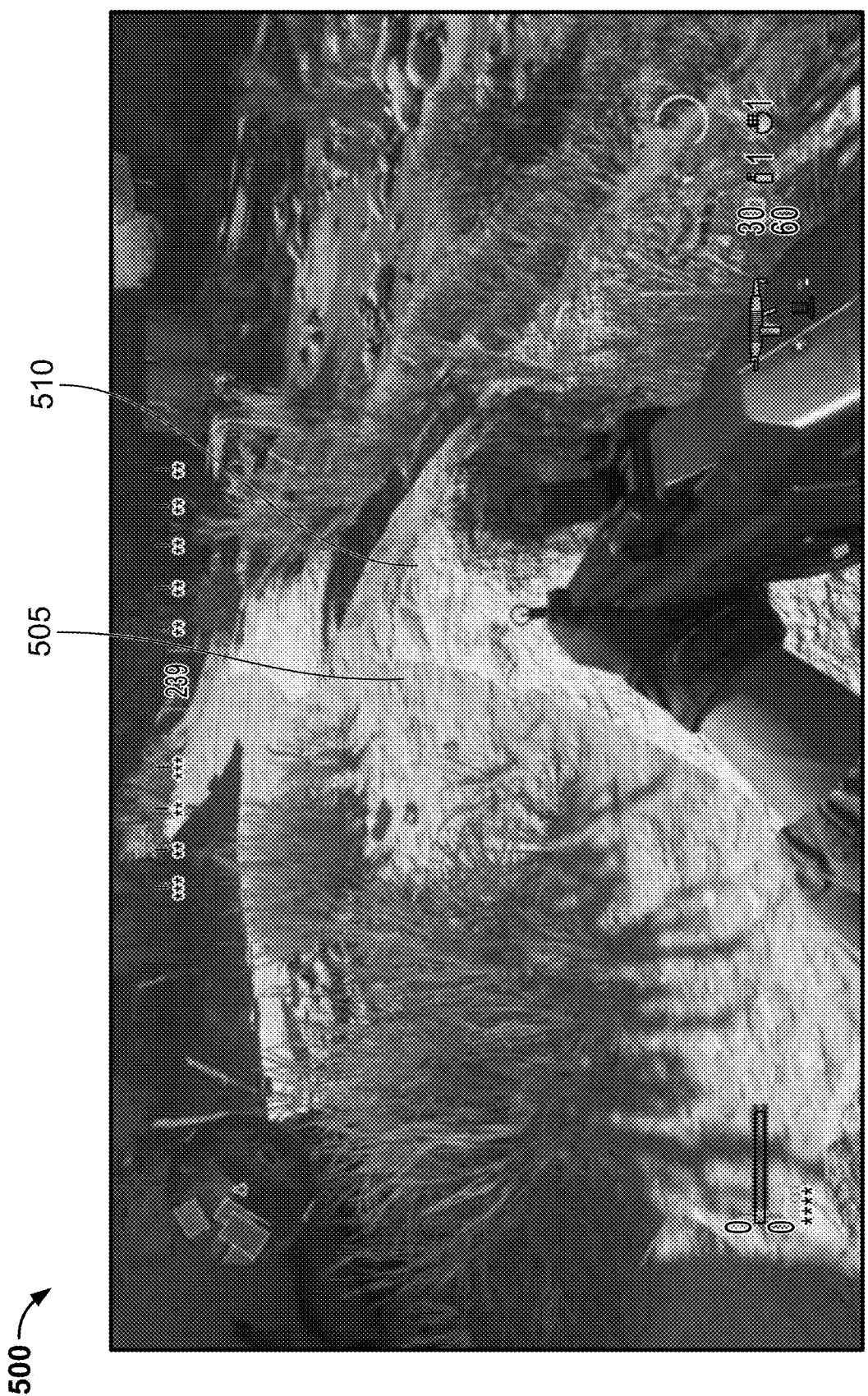
FIG. 5A shows a game scene without projected decals.
Figure 5B:
FIG. 5B shows the same game scene with projected decals, in accordance with some embodiments of the present specification.

Step 3: Next, each spatial unit in the third group of spatial units is tested only against the second subset of 1 decal from the parent spatial unit. Every spatial unit of the second group of spatial units encapsulates 8 spatial units of the third group of spatial units. In embodiments, if d=2, then a spatial unit encapsulates 2*2*2 spatial units of the next group. Consequently, the third group of spatial units requires 30×17×16×1=8160 tests. After the tests, every spatial unit may have a third subset of decals. Let us assume every spatial unit will reference only one decal projection, although at this point, there will be many spatial units with no decal projections at all. For example, black spatial units 405 illustrated in a frame 400 of FIG. 4 are indicative of spatial units with no decal projections.

Step 4: Finally, each spatial unit in the fourth group of spatial units (that is, the highest resolution group of spatial units) is tested only against the third subset of one or more decals from the parent spatial unit. Every spatial unit of the third group of spatial units encapsulates 192 spatial units of the fourth group of spatial units. Consequently, the fourth group of spatial units requires 60×34×32×1=65280 tests (assuming every spatial unit will reference only one decal projection). After the tests, every spatial unit may have a fourth subset of decals. The fourth subset of decals per spatial unit determined at this last step is used for spatial unit shading.

The total number of tests amount to 160000+7560+8160+65280=241000 tests. In contrast, a conventional brute force method would test intersection between every spatial unit and every decal volume. Therefore, for 1000 decals in camera view this would require: 60×34×32×1000=65280000 tests=~65M tests. This is a large number and approximately 300 times more than the number of tests required using the method 200 of the present specification. Thus, every spatial unit contains a shortlist or subset of decals that potentially intersect pixels that fall into the spatial unit. Processing the shortlist or subset of decals per spatial unit has a manageable computational cost.

Also, in practice, decals are not evenly distributed. There are spatial units with no decals at all and spatial units with many decals. Therefore, tests may be skipped entirely for spatial units that are empty. For instance, if at step 1 a spatial unit is determined to be empty (that is, has no intersecting decal projection), the entire hierarchy of tests—2×2×2, 4×4×4, 8×8×8—is skipped, further reducing the number of tests.

The above examples are merely illustrative of the many applications of the system of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A method of shading spatial units during rendering of a frame of a game space in a multiplayer video game, wherein the game space is implemented on a plurality of player client devices by at least one server in data communication with the plurality of player client devices over a network, the method being implemented by the at least one server executing a plurality of programmatic instructions and comprising:

acquiring a number of pixels in a field of view of a virtual camera associated with the game space, wherein the field of view has an associated plurality of decal projections;

generating one or more groups of spatial units by progressively dividing the field of view, wherein the one or more groups of spatial units range from a lowest resolution group of spatial units through one or more intermediate resolution groups of spatial units to a highest resolution group of spatial units, and wherein each group of the one or more groups of spatial units represents a higher resolution compared to an immediately previous group of spatial units, and wherein each spatial unit has a predefined number of pixels acquired from the field of view of the virtual camera associated with the game space;

testing each spatial unit of a lowest resolution group of spatial units to determine a subset of decal projections, of the plurality of decal projections, that intersect each spatial unit of the lowest resolution group of spatial units;

iteratively testing each spatial unit of a next higher resolution group of spatial units to determine a next subset of decal projections using the subset of decal projections determined for the immediate previously tested lower resolution group of spatial units, wherein the iterative testing determines which of the subset of decal projections intersect the spatial unit of the next higher resolution group of spatial units, and wherein the iterative testing ends with testing of each spatial unit of the highest resolution group of spatial units to determine a final subset of decal projections that intersect each spatial unit of the highest resolution group of spatial units; and shading spatial units using the final subset of decal projections per spatial unit.

2. The method of claim 1, wherein the field of view is progressively divided based on a predefined divisor, and wherein the divisor is a natural number greater than 1.

3. The method of claim 1, wherein a number of decal projections in the subset of decal projections is less than the plurality of decal projections.

4. The method of claim 3, wherein a number of decal projections in the next subset of decal projections is less than the subset of decal projections.

5. The method of claim 1, wherein at least the final subset of decal projections is sorted, in ascending order, based on an identification number associated with each decal projection.

6. The method of claim 1, wherein if a spatial unit, of the one or more groups of spatial units, is determined to be devoid of intersecting decals then no further tests are conducted for higher resolution spatial units encapsulated by the spatial unit.

7. The method of claim 1 wherein each spatial unit has a length comprising a first predefined number of pixels, a width comprising a second predefined number of pixels, and a depth defined in terms of world space units representing a distance/depth into a world space corresponding to the game space of the multiplayer video game.

8. A system for determining shading of spatial units during rendering a frame of a game space, the system comprising: at least one server in data communication with a plurality of player client devices over a network, wherein the at least one server implements the game space on the plurality of player client devices and is configured to:

acquiring a number of pixels in a field of view of a virtual camera associated with the game space, wherein the field of view has associated a plurality of decal projections;

generating one or more groups of spatial units by progressively dividing the field of view, wherein the one or more groups of spatial units range from a lowest resolution group of spatial units through one or more intermediate resolution groups of spatial units to a highest resolution group of spatial units, and wherein each group of the one or more groups of spatial units represents a higher resolution compared to an immediately previous group of spatial units, and wherein each spatial unit has a predefined number of pixels acquired from the field of view of the virtual camera associated with the game space;

testing each spatial unit of a lowest resolution group of spatial units to determine a subset of decal projections, of the plurality of decal projections, that intersect the spatial unit of the lowest resolution group of spatial units;

iteratively testing each spatial unit of a next higher resolution group of spatial units to determine a next subset of decal projections, of the subset of decal projections determined for the immediate previously tested lower resolution group of spatial units, that intersect the spatial unit of the next higher resolution group of spatial units, wherein the iterative testing ends with testing of each spatial unit of the highest resolution group of spatial units to determine a final subset of decal projections that intersect the spatial unit of the highest resolution group of spatial units; and using the final subset of decal projections per spatial unit during the shading of spatial units.

9. The system of claim 8, wherein the field of view is progressively divided based on a predefined divisor, and wherein the divisor is a natural number greater than 1.

10. The system of claim 8, wherein a number of decal projections in the subset of decal projections is less than the plurality of decal projections.

11. The system of claim 10, wherein a number of decal projections in the next subset of decal projections is less than the subset of decal projections.

12. The system of claim 8, wherein at least the final subset of decal projections is sorted, in ascending order, based on an identification number associated with each decal projection.

13. The system of claim 8, wherein if a spatial unit in a group of spatial units, of the one or more groups of spatial units, is determined to be devoid of intersecting decals then no further tests are conducted for smaller spatial units, encapsulated by the spatial unit, in higher resolution groups of spatial units.

14. The system of claim 8 wherein each spatial unit has a length comprising a first predefined number of pixels, a width comprising a second predefined number of pixels, and a depth defined in terms of world space units representing a distance/depth into a world space corresponding to the game space.

15. A method of determining shading of spatial units while rendering a frame of a game space, wherein the game space has an associated virtual camera defining a field of view of a plurality of pixels, the method being implemented in a computer having a processor and a random access memory, wherein the processor is in data communication with a display and with a storage unit, the method comprising:

using the field of view to generate one or more groups of spatial units, wherein the one or more groups of spatial units range from a lowest resolution group of spatial units through one or more intermediate resolution groups of spatial units to a highest resolution group of spatial units, and wherein each group of the one or more groups of spatial units represents a higher resolution compared to an immediately previous group of spatial units, and wherein each spatial unit has a predefined number of pixels;

for each spatial unit of a lowest resolution group of spatial units, determining a subset of decal projections that intersect the spatial unit of the lowest resolution group of spatial units;

for each spatial unit of a next higher resolution group of spatial units, iteratively determining a next subset of decal projections, of the subset of decal projections determined for the immediate previous lower resolution group of spatial units, that intersect the spatial unit of the next higher resolution group of spatial units, wherein the iterative determining ends when for each spatial unit of the highest resolution group of spatial units a final subset of decal projections is determined that intersect the spatial unit of the highest resolution group of spatial units; and using the final subset of decal projections during the shading of spatial units.

16. The method of claim 15, wherein the one or more groups of spatial units are generated by progressively dividing the field of view by a predefined divisor, and wherein the divisor is a natural number greater than 1.

17. The method of claim 15, wherein a number of decal projections in the subset of decal projections is less than the plurality of decal projections and wherein a number of decal projections in the next subset of decal projections is less than the subset of decal projections determined for the immediate previous lower resolution group of spatial units.

18. The method of claim 15, wherein at least the final subset of decal projections is sorted, in ascending order, based on an identification number associated with each decal projection.

19. The method of claim 15, wherein if a spatial unit in a group of spatial units, of the one or more groups of spatial units, is determined to be devoid of intersecting decals then smaller spatial units, encapsulated by the spatial unit, in higher resolution groups of spatial units are not processed for determining intersecting decal projections.

20. The method of claim 15 wherein each spatial unit has a length comprising a first predefined number of pixels, a width comprising a second predefined number of pixels, and a depth defined in terms of world space units representing a distance/depth into a world space corresponding to the game space.

\* \* \* \* \*